Figure 1:
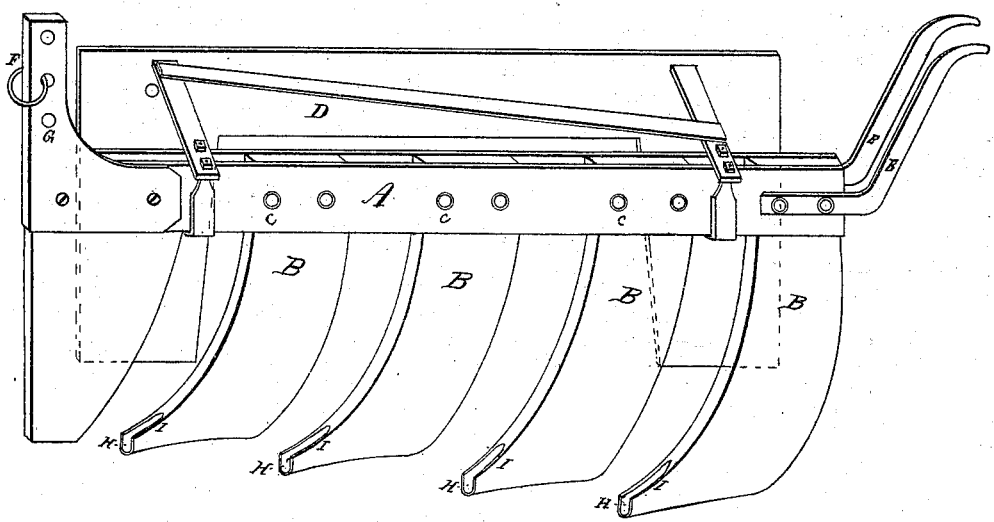

GEORGE B. GRUMAN.

Improvement in Ice Plows.

No. 125,131.                                  Patented April 2, 1872.

Witnesses:                                    Inventor:

125,131

UNITED STATES PATENT OFFICE.

GEORGE B. GRUMAN, OF RIDGEFIELD, CONNECTICUT.

IMPROVEMENT IN ICE-PLOWS.

Specification forming part of Letters Patent No. 125,131, dated April 2, 1872.

SPECIFICATION.

I, GEORGE B. GRUMAN, of the town of Ridgefield, county of Fairfield and State of Connecticut, have invented certain Improvements in the Construction of Ice-Plows, of which the following is a specification:

My invention relates to the application of gouge-pointed points and keen-cutting side edges to the several teeth or cutters.

*General Description.*

In the drawing accompanying this specification, Figure 1 is a side view of the ice-plow, showing the gouge-pointed cutters.

A is the beam of the plow, composed of two thicknesses of iron plates to receive the broad teeth or cutters B, which are placed at proper distances apart between the two plates A, and are fastened and secured together by bolts C, passing through the same, as shown in the drawing. D is the guide and gauge, running on the ice parallel with the beam A. F, the vertical stem, to which the horse is attached, having holes G to alter the line of draft. E E are the handles for guiding the plow.

My invention consists of the application of the gouge-shaped points H to the cutters B with the keen-cutting side edges I, the concave part running upward a certain distance on the front edge.

The advantage of these gouged-shaped points and sharp side edges is in the improved lightness of the plowing operation, and the facility with which they clear the sides of the groove or channel as they descend and travel along.

I do not claim as new the gouge-points of themselves, but only the arrangement and application to the teeth or cutters of ice-plows.

What I claim as my invention is—

The arrangement and application of gouge-points and cutting side edges to the cutters or teeth of ice-plows, in the manner substantially as herein set forth and described.

GEORGE B. GRUMAN.

Ridgefield Station, Conn., December 16, 1871.

Witnesses:
 JOSEPH F. FOOTE,
 WM. VINE.